July 6, 1965     A. PARENT     3,192,872
SUSPENDED VEHICLE
Filed Nov. 15, 1963     3 Sheets-Sheet 1
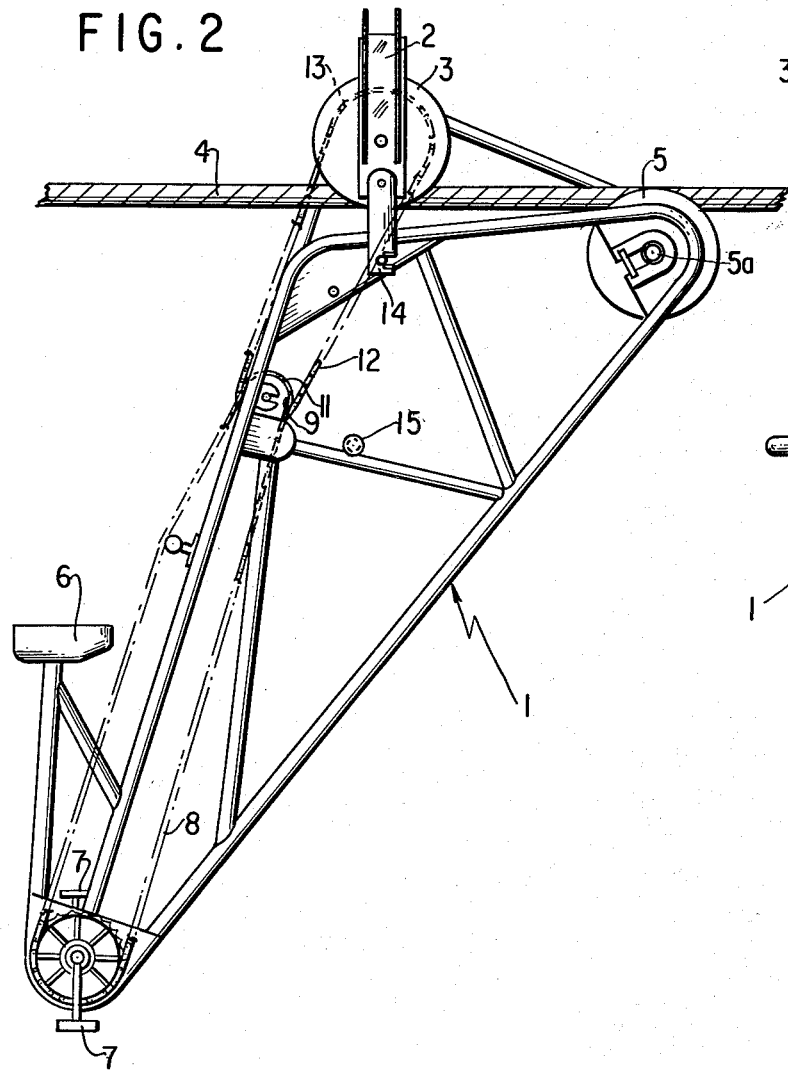
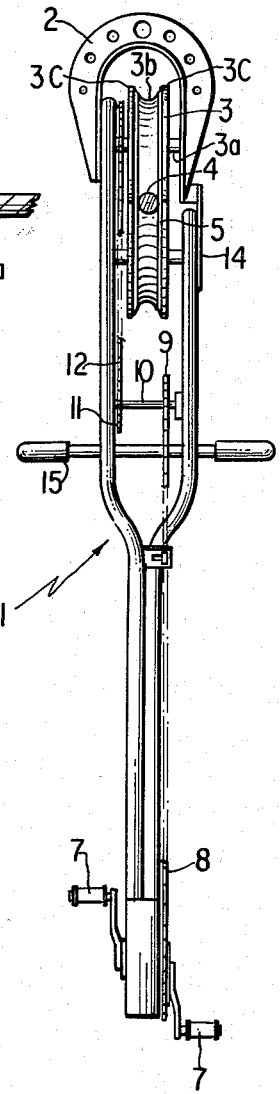
INVENTOR
ALFRED PARENT
BY *Hammond and Little*
ATTORNEYS

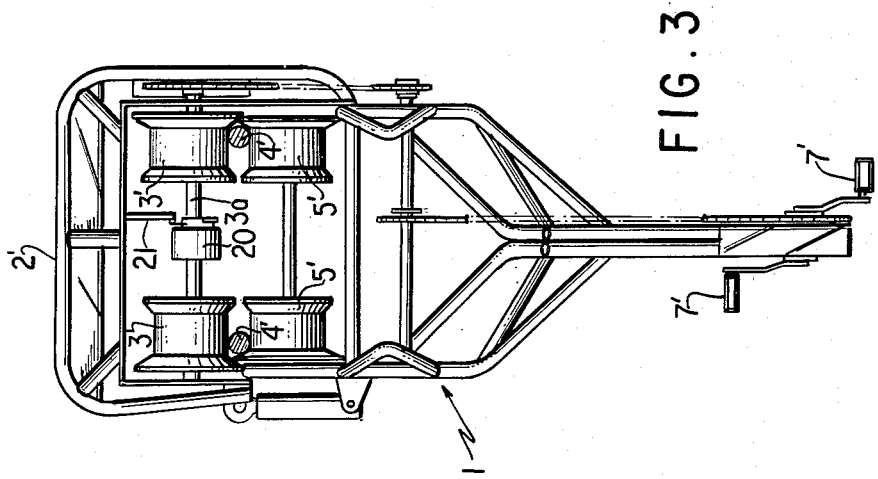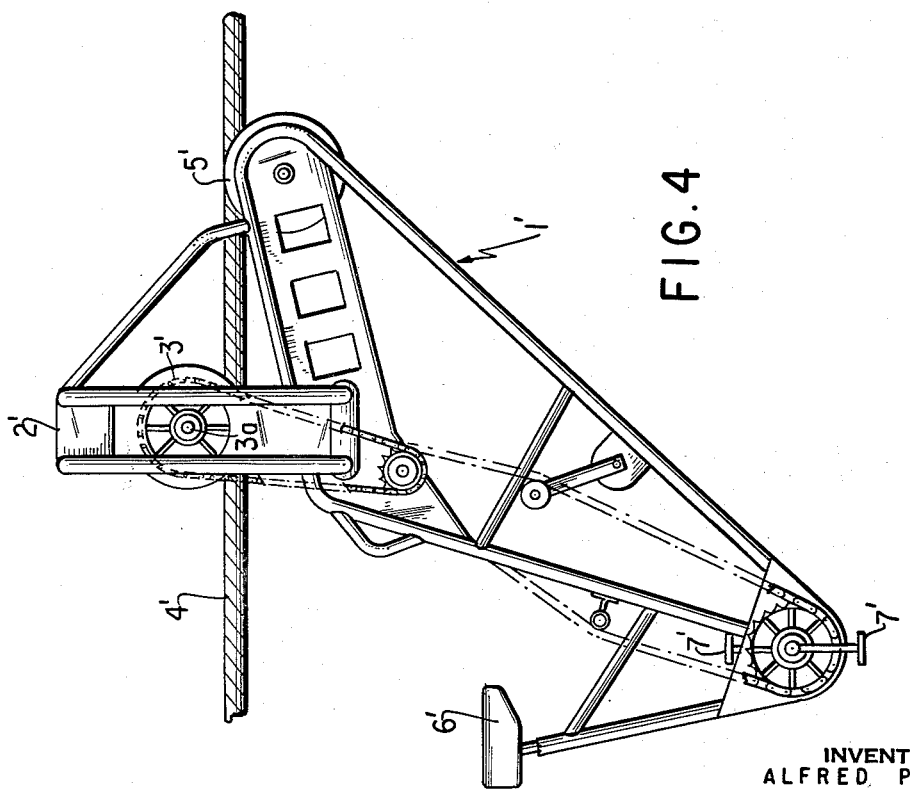

July 6, 1965  A. PARENT  3,192,872
SUSPENDED VEHICLE
Filed Nov. 15, 1963  3 Sheets-Sheet 3

INVENTOR
ALFRED PARENT
BY
ATTORNEYS

United States Patent Office 3,192,872
Patented July 6, 1965

3,192,872
SUSPENDED VEHICLE
Alfred Parent, Lot et Garonne, Lavardac, France
Filed Nov. 15, 1963, Ser. No. 324,117
Claims priority, application France, July 23, 1963,
942,400
6 Claims. (Cl. 104—93)

This invention relates to a vehicle adapted to be suspended from an overhead cable or cables, and refers more particularly to a vehicle for supporting an operator or operators to enable work to be performed on said cable or cables.

Frequently the only convenient method of carrying out various repair or maintenance jobs on overhead electric transmission lines (such as beaconing, placing and removal of collars, struts, sleeves, partial re-cabling, etc.) is to use the transmission line as a path over which an operator or operators can be conveyed to the place where work is to be done.

The main object of the invention is to provide an improved vehicle which is efficient in use enabling the operator or operators to be supported in the most convenient position for carrying out the work to be performed.

The invention relates to a single seater self-contained vehicle which can be suspended from and move along a cable, an electric transmission line, or conductor, such vehicle comprising a frame, one or more suspension rollers or pulleys mounted on such frame and straddling the or each conductor when the vehicle is in use, one or more gripping rollers mounted on the frame and offset forwardly in relation to the or each suspension roller and engaging the bottom of the or each cable and serving to maintain the position of the vehicle suspended by the or each suspension roller and prevent the vehicle from swaying. The or each suspension roller is driven and rotated by a mechanical device comprising a pedal attachment actuated by the user who sits on a saddle supported by the frame. A braking system at the user's disposal enables him to lock the or each suspension roller and immobilise the vehicle at a selected place along the cable.

When the transmission line comprises a single cable of large section, the device comprises one suspension roller and one gripping roller. For lines in a cluster, such as two conductors per phase, the device comprises two suspension rollers and two gripping rollers.

The frame is preferably formed of light alloy tubes assembled by welding.

Preferred embodiments of the invention will now be described with reference to the accompanying drawings, wherein:

FIG. 1 is a diagrammatic front elevation of a "single cable" vehicle having one suspension roller and one gripping roller and mounted on a single cable, transmission line or conductor;

FIG. 2 is a diagrammatic side elevation of the vehicle illustrated in FIG. 1;

FIG. 3 is a diagrammatic front elevation of a "two cable" vehicle having two suspension rollers and two gripping rollers and mounted on two cables, transmission lines or conductors;

FIG. 4 is a diagrammatic side elevation of the vehicle illustrated in FIG. 3.

Figure 5:
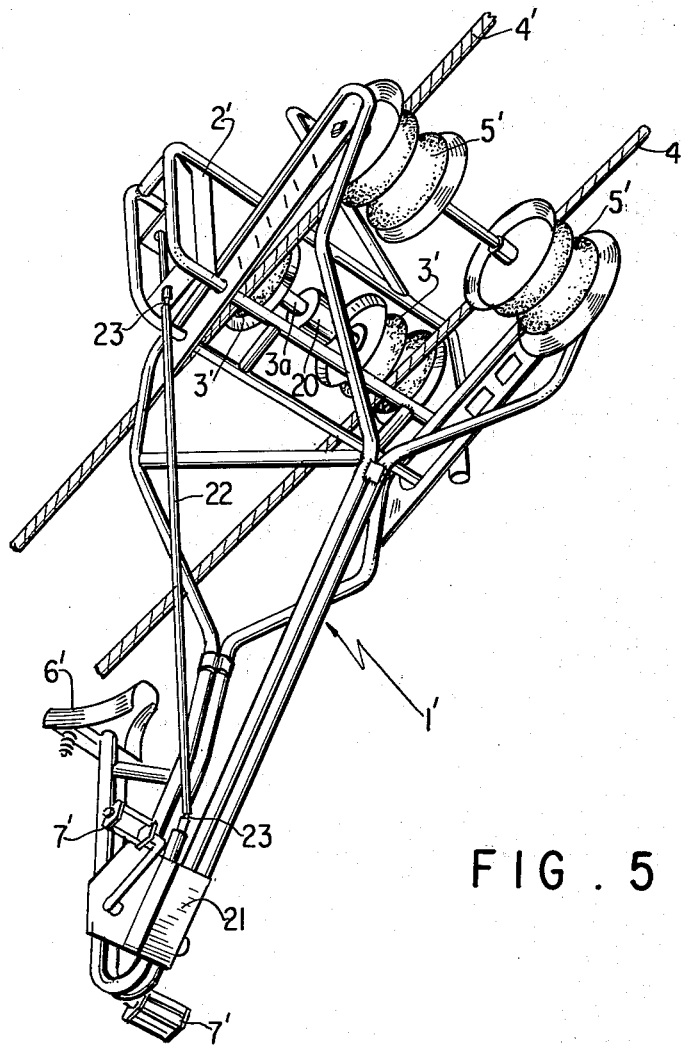
FIG. 5 is a perspective view of another embodiment of a "two cable" vehicle.

Referring to FIGS. 1 and 2, the "single cable" vehicle according to the present invention comprises a tubular frame 1 of aluminium or an alloy thereof. In the top portion 2 which forms a bracket is mounted a suspension roller 3 unitary with an axle 3a rotatably mounted on frame 1. Roller 3 has a rounded groove 3b and flanges 3c and straddles a cable, transmission line or conductor 4. On the front of frame 1 is mounted a gripping roller 5 rotatable on an axle 5a. Roller 5 is similar in shape to roller 3. The roller 5 engages tightly the bottom of cable 4 so that swaying of the vehicle in the suspended state is prevented or greatly reduced.

To the bottom of frame 1 is attached a bicycle-type saddle 6 on which the user sits. Saddle 6 is located in relation to a vertical plane passing through the suspension axle 3a, on the side remote from roller 5, so that when the vehicle is in use the user's weight assists in increasing the pressure of roller 5 on cable 4 thus serving to prevent any swaying of the suspended vehicle.

The user can actuate a pedal attachment 7 located at the bottom of frame 1, the pedal attachment 7 driving a chain 8 which by means of a toothed disc 9 on a shaft 10 on which is mounted a second toothed disc 11, drive axle 3a and suspension roller 3 through the intermediary of a chain 12 connecting disc 11 and a disc 13 on axle 3a so as to move the vehicle along the cable.

A conventional brake drum (not shown) controlled by a fixed rack lever is disposed inside suspension roller 3 for the purpose of locking the vehicle on the cable at the place were work is to be performed.

The vehicle is placed on the cable, transmission line or conductor by displacing a rocker arm 14 pivoting on a pivot 14a, thereby enabling the cable to come under the bracket formed by the top portion of frame 1.

Rollers 3 and 5 have each a rounded groove and flanges to prevent derailment of the vehicle when sleeves, for instance, are being passed. The gripping surfaces of the rollers are covered with very hard rubber to prevent damage to the cable, transmission line or conductor.

The apparatus according to the invention can be used by one operator to perform certain simple jobs, but when the work requires the presence of two operators on the transmission line between masts, the second operator can be provided for by means of an E.D.F.-type hooked ladder one end of which is secured to the vehicle and its other free end attached to the line by means of a bracket fitted with a pulley. To this end, the vehicle according to the invention can be provided with two supports (not shown), one of which is located at the front of the vehicle and the other at the rear thereof so that the vehicle can be pushed or pulled.

Safety devices are also provided, for instance, safety belts connected by a strap to the top of the vehicle or to the transmission line. Lastly, a supporting bar 15 allows the user to keep himself firmly balanced.

FIGS. 3 and 4 illustrate another embodiment of the vehicle according to the invention in which the vehicle is suspended from two cables, transmission lines or conductors disposed substantially parallel to one another in the same horizontal plane. In FIGS. 3 and 4 like elements to the elements in FIGS. 1 and 2 are denoted by like references followed by a prime.

The vehicle comprises two coaxial suspension rollers 3' and two coaxial gripping rollers 5'. A driving force is transmitted from pedal attachment 7' via a conventional pinion system. The two rollers 3' are mounted on the same axle 3a' on which the brake drum 20 controlled by a fixed rack lever 21 is mounted.

FIG. 5 illustrates another embodiment of the "two cable" vehicle illustrated in FIGS. 3 and 4, characterized in that the drive is transmitted from pedal attachment 7' through a gearbox 21, a transmission rod 22 and universal joints 23.

It will be understood that the invention is not limited by the driving transmission system used. A motor, for instance an electric motor, could be substituted for the pedal attachment. Also, although the vehicle was devised for the conveyance of an operator along an electric transmission line, it can clearly be applied for conveyance along any cable, cable assembly, transmission line or conductor.

What I claim is:

1. A vehicle adapted to be supported on at least one cable and to move along said cable comprising a frame, an operator's station, a suspension roller axle rotatably mounted on said frame, at least one suspension roller fixedly mounted on said suspension roller axle, said at least one suspension roller being adapted to straddle at least one cable when the vehicle is in use, a gripping roller axle offset from said suspension roller axle and rotatably mounted on said frame, at least one gripping roller fixedly mounted on said gripping roller axle, said at least one gripping roller being adapted to grip the bottom of at least one cable and to prevent the vehicle from swaying, each of said suspension roller and said gripping roller being adapted to act on the same cable, a drive for rotating said suspension roller axle and a braking device for locking the suspension roller axle and immobilizing the vehicle, said frame having its center of gravity offset from said suspension roller axle whereby the vehicle rotates around said suspension roller axle and forces said offset gripping roller axle having at least one gripping roller against the bottom of the cable.

2. A vehicle adapted to be supported on a cable and to move along said cable, comprising a frame, a suspension roller axle rotatably mounted on said frame, a suspension roller fixedly mounted on said suspension roller axle, said suspension roller being adapted to straddle the cable when the vehicle is in use, a gripping roller axle offset from said suspension roller axle and rotatably mounted on said frame, a gripping roller fixedly mounted on said gripping roller axle, said gripping roller being adapted to grip the bottom of the cable and to prevent the vehicle from swaying, each of said suspension roller and said gripping roller being in the same plane, a drive for rotating said suspension roller axle, and a saddle on the frame on which the user of the vehicle may sit, the saddle being located on one side of a vertical plane passing through the axis of the suspension roller whereby the weight of the user augments the grip of the gripping roller on the cable, the gripping roller being located on the other side of said vertical plane.

3. A vehicle adapted to be supported on a pair of cables and to move along said cables, comprising a frame, an operator's station, a suspension roller axle rotatably mounted on said frame, two suspension rollers fixedly mounted on said suspension roller axle, said suspension rollers being adapted to straddle two parallel cables when the vehicle is in use, a gripping roller axle offset from said suspension roller axle and rotatably mounted on said frame, two gripping rollers fixedly mounted on said gripping roller axle, each of said gripping rollers being aligned with each of said suspension rollers and being adapted to grip the bottom of one of the parallel cables, a drive for rotating said suspension roller axle, and a braking device for locking the suspension roller axle and immobilizing the vehicle, said frame having its center of gravity offset from said suspension roller axle whereby the vehicle rotates around said suspension roller axle and forces said offset gripping roller axle and the two gripping rollers against the bottom of the two cables.

4. The vehicle of claim 1 wherein said drive for rotating said suspension roller axle is a pedal device actuated by the user.

5. The vehicle of claim 2 wherein said drive for rotating said suspension roller axle is a pedal device actuated by the user.

6. The vehicle of claim 3 wherein said drive for rotating said suspension roller axle is a pedal device actuated by the user.

References Cited by the Examiner

UNITED STATES PATENTS

| 559,238 | 4/96 | Weaver et al. | 104—91 |
| 563,793 | 7/96 | Nickerson | 104—93 |
| 596,895 | 1/98 | Martin | 104—93 |
| 2,639,676 | 5/53 | Travis et al. | 105—153 |

MILTON BUCHLER, *Primary Examiner.*

LEO QUACKENBUSH, *Examiner.*